April 10, 1951   T. A. WOOLSEY   2,548,249
BAND CLAMP
Filed July 1, 1946

INVENTOR
Theodore A. Woolsey
BY Lynn Latta
ATTORNEY

Patented Apr. 10, 1951

2,548,249

UNITED STATES PATENT OFFICE 2,548,249

BAND CLAMP

Theodore A. Woolsey, Pasadena, Calif., assignor to Marman Products Co., Inc., a corporation of California Application July 1, 1946, Serial No. 680,615

4 Claims. (Cl. 285—129)

This invention relates to a device for establishing a sealing connection between the ends of aligned tubular members. Its general object is to provide an improved band clamp type of connecting and sealing means. More specifically, the invention aims to provide a band device adapted to encircle abutting ends of tubular members and to transform a constricting radial force into opposed axial forces urging the abutting ends of the tubular members into sealing relation.

One of the objects of the invention is to provide a band clamp adapted to transform radial pressure into axial pressure without utilizing a camming action. Radially inwardly directed pressure is applied to the diverging extremities of the side walls of an annular channel which embraces outwardly extending flanges on the tubular members that are to be joined. The respective side walls of the channel are adapted to yield toward each other under the radial pressure and thus to develop an axial pressure against the tube flanges. One of the objects of the invention is to provide such a channel member which is so constructed as to resolve the radial pressure into axial pressure.

The utilization of such a force-resolving member makes it possible to eliminate machining of the interacting surfaces to close tolerances, and thereby to utilize relatively inexpensive stamped and formed sheet metal parts. It is therefore an important object of my invention to provide a band clamp that is relatively simple and quite inexpensive in construction, yet at the same time very efficient in the execution of its intended function.

Other objects will become apparent in the ensuing specifications and appended drawings, in which.

Figure 1:
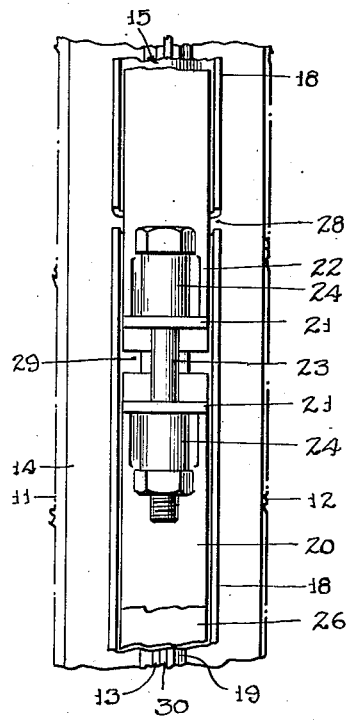
Fig. 1 is a side view of a portion of a band clamp embodying my invention with tubular members connected thereby.
Figure 2:
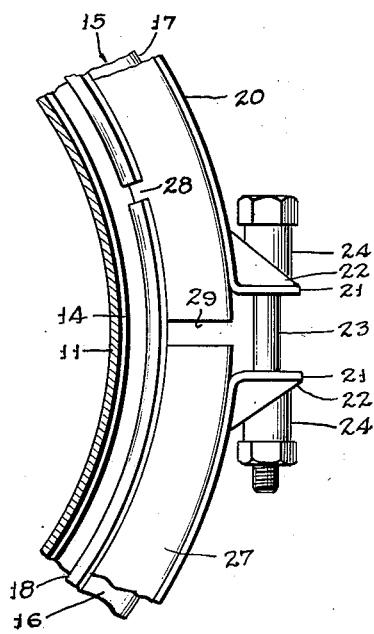
Fig. 2 is an end view, partially in section, of the band clamp shown in Fig. 1.

As an example of one form in which my invention may be embodied, I have shown in the drawings a band clamp adapted to join adjacent ends of tubes 11 and 12. At their ends, the tubes 11 and 12 are provided with outwardly extending flat annular flanges 13 which may in some instances be formed integrally with the tubes 11 and 12, and in other cases, be part of separate collars 14 that are welded at $w$ to the tube members 11 and 12.

A force resolving channel 15, formed of sheet metal, includes side walls 16, joined by a peripheral rim 17, and a pair of abutment rings 18 at the inner extremities of the walls 16. The inner surfaces of the walls 16 engage the outer extremities of the flanges 13. These outer extremities may be provided, on their remote sides, with frusto-conical bearing faces 19, inclined to fit the angle of divergence of a pair of the side walls 16. This bearing engagement is restricted to the areas of the walls 16 adjacent the rim 17. Adjacent the abutment rings 18 the walls 16 flare away from the flanges 13.

Constricting tension is developed preferably by a separate constricting band 20 of a material having a high tensile strength, such as, for example, ribbon steel. The ends of the band 20 are bent outwardly to form ears 21, which are braced by gussets 22. A draw bolt 23 extends through openings in the ears 21 and through sleeves 24 which engage the ears 21.

The draw bolt 23 functions to develop constriction of the band 20, to exert radial pressure against a pair of jaw members 25. Each jaw member 25 includes an arcuate web portion 26 and a pair of side flanges 27. The inner edges of the flanges 27 bear against the abutment rings 18 of the force-resolving annular channel 15.

The annular channel 15 is split, as at 28, so that it may be opened up sufficiently to permit of its being placed over the flanges 13. Preferably, it is formed with a natural curvature on a radius sufficiently large to pass over the flanges 13 (i. e. it is preformed in the open position). It will then assume its closed position, embracing the flanges 13, as the result of tightening of the band 20. The jaw members 25 are separated by diametrically opposed spaces, one of which is shown at 29.

As the band 20 is tightened, the flanges 27 will exert pressure radially inwardly against the abutment rings 18. The engagement of the outer regions of the walls 16 against the surfaces 19 of the flanges 13 will limit the amount of possible inward contraction of the channel 15 under this radially inwardly directed pressure, and a further radial pressure will cause the walls 16 to fulcrum against the surfaces 19 and to resolve the radial forces into axial pressure against the flanges 13. This resolution of forces arises from the inwardly diverging relationship of the walls 16 and the spacing of the inner regions of the walls 16 away from the flanges 13. The radial pressure tends to swing the spaced inner regions of the walls 16 toward each other about their fulcrums on the surfaces 19, resulting in opposing axial forces pressing the flanges 13 toward each other. It will be apparent from the foregoing that the sheet metal of the channel 15 is sufficiently stiff, springy and elastic to have a lever function, transmitting couple-type forces tending to bend its side walls, without being permanently deformed thereby. This stiff, springy characteristic may appropriately be identified in brief form by the word "elastic," for the purpose of distinguishing from a soft, inelastic metal, such as lead, which would be unsuitable for transmitting bending couples with a leverage action such as that described above. The word "elastic" is therefore used in the appended claims to indicate this stiff, springy characteristic.

For maximum sealing effect, a gasket washer 30 may be interposed between the flanges 13.

It is to be understood that the foregoing description is by way of exemplification of one form in which the invention may be embodied, and that I do not intend that my claims shall be restricted to the particular embodiment described. Other specific forms of band clamps embodying the principles of construction characterizing the invention, may be utilized.

Figure 4:
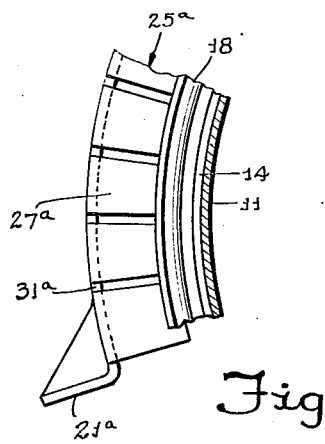
Fig. 4 is a side view of a portion of a clamp embodying a modified form of the invention.
Figure 3:
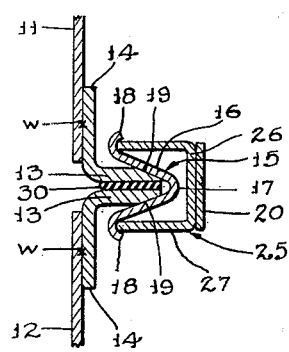
Fig. 3 is a transverse sectional view through the clamp.

In the modified form of the invention shown in Fig. 4, the jaw members 25a have, instead of the flanges 27, a plurality of fingers 27a that are arranged in axially opposed pairs, extending radially inwardly. The fingers 27a are circumferentially separated by relatively narrow slots 31a. The inner edges of the fingers 27a bear against the abutment rings 18 of the force-resolving annular channel 15.

In this modified form of the invention, the jaw members 25a are constructed from channel material like the channel material of the jaw members 25, but differing therefrom in that the side flanges thereof have been slotted to produce the slots 31a, dividing said side flanges into the sections which comprise the fingers 27a. Also, the separate bands 20 are dispensed with, and the ears 21a are formed as integral extensions of the web portions of the channel members.

I claim as my invention:

1. In a band clamp for joining adjacent ends of aligned tubular members having outwardly extending flanges, an annular force-resolving channel comprising side walls diverging toward the axis thereof and a rim portion joining said side walls, said side walls being adapted to embrace said flanges and to engage the same near said rim with the inner extremities of said side walls flaring away from said flanges, said side wall having at said inner extremities, axially extending abutment portions, a constricting band, means for applying constricting tension to said band, and a plurality of circumferentially spaced pressure fingers carried by said band, extending radially inwardly therefrom, embracing said channel, and, at their inner ends, bearing against said abutment portions to deliver thereto radial forces which will result in springing of said inner portions of said walls toward each other with the intermediate portions of said walls fulcruming against said flanges.

2. In a band clamp for joining adjacent ends of aligned tubular members having outwardly extending flanges at said ends, an annular force-resolving channel adapted to encircle and embrace said flanges, said channel including a rim portion and side walls diverging toward the axis of said channel from said rim portion and terminating at their inner extremities in axially directed abutment rings, a constricting band, and pressure transferring means comprising an annular web member secured to the inner face of said band and a plurality of circumferentially spaced pressure transmitting fingers extending radially inwardly from both sides of said web member, embracing said channel and, at their other ends, bearing against said abutment rings to transmit radial pressure thereto.

3. In a band clamp for joining adjacent ends of aligned tube sections having outwardly extending flanges, an annular force-resolving channel comprising side walls diverging toward the axis thereof, and a rim joining said side walls, said side walls embracing said flanges and engaging the same near said rim with the inner extremities of said side walls flaring and spaced from said flanges, said side walls having at said inner extremities, axially outwardly extending abutment portions, an annular constricting band having a cross sectional shape generally that of a square channel, including flanges projecting radially inwardly, embracing said channel, and, at their inner extremities, bearing against said abutment portions to deliver thereto radial forces which will result in springing said inner portions of said walls toward each other with the intermediate portions of said walls fulcruming against and applying pressure to said tube flanges near the outer extremities of the latter, whereby said walls function to develop force multiplying leverage action for tightly clamping said tube flanges toward each other.

4. In a band clamp for joining adjacent ends of aligned tube sections having outwardly extending flanges, an annular force-resolving channel comprising side walls diverging toward the axis thereof, and a web portion joining said side walls, said side walls embracing said flanges and engaging the same near said rim with the inner extremities of said side walls flaring and spaced from said flanges, said side walls having at said inner extremities, axially outwardly extending abutment portions, an annular constricting band of channel shaped cross section, including flanges projecting inwardly, embracing said channel, and, at their inner extremities, bearing against said abutment portions to deliver thereto radial forces which will result in springing said inner portions of said walls toward each other with the intermediate portions of said walls fulcruming against and applying pressure to said tube flanges near the outer extremities of the latter, whereby said walls function to develop force multiplying leverage action for tightly clamping said tube flanges toward each other.

THEODORE A. WOOLSEY.

REFERENCES CITED

The following references are of record in the file of this patent:

UNITED STATES PATENTS

| Number | Name | Date |
| --- | --- | --- |
| 184,599 | Ehrhardt | Nov. 21, 1876 |
| 711,946 | Day | Oct. 28, 1902 |
| 2,159,355 | Goetze | May 23, 1939 |